US012499225B1

(12) United States Patent
Bushner et al.

(10) Patent No.: US 12,499,225 B1
(45) Date of Patent: *Dec. 16, 2025

(54) AGENT MESSAGE BUS

(71) Applicant: Halcyon Tech, Inc., Austin, TX (US)

(72) Inventors: Robert Bushner, Homeland, CA (US);
Alejandro Espinoza, San Marcos, CA (US); Kristen Lamb, Austin, TX (US);
Seagen Levites, Oregon City, OR (US);
Clark Lindsey, Loudon, TN (US);
Jonathan Miller, Poway, CA (US);
Peter Morgan, Scottsdale, AZ (US);
Michael Mullin, Kanata (CA); Ryan Smith, Austin, TX (US); Vu Ta,
Fellbach (DE); Seva Tonkonoh, San Francisco, CA (US); Timothy West,
Austin, TX (US)

(73) Assignee: Halcyon Tech, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/902,564

(22) Filed: Sep. 30, 2024

Related U.S. Application Data

(63) Continuation of application No. 18/744,564, filed on Jun. 14, 2024, now Pat. No. 12,130,914.

(51) Int. Cl.
*G06F 21/55* (2013.01)
*G06F 21/00* (2013.01)
*G06F 21/56* (2013.01)
*G06F 21/57* (2013.01)

(52) U.S. Cl.
CPC .......... *G06F 21/554* (2013.01); *G06F 21/566* (2013.01); *G06F 21/577* (2013.01)

(58) Field of Classification Search
CPC .... G06F 21/554; G06F 21/566; G06F 21/577; H04L 63/14; H04L 63/1408; H04L 63/1416; H04L 63/1425; H04L 63/1433; H04L 63/1441
See application file for complete search history.

(56) References Cited

U.S. PATENT DOCUMENTS

2007/0283194 A1* 12/2007 Villella ............... G06F 11/3476
714/E11.204

* cited by examiner

*Primary Examiner* — Edward Zee
(74) *Attorney, Agent, or Firm* — Jones Day

(57) ABSTRACT

Applications and processes executing on an endpoint are monitored to identify behavior indicative of malicious activity such as a ransomware attack. Messages generated from this monitoring as well as messages derived from external sources are stored in a queue for routing. A router selects some messages from the queue based on a routing policy and sends them to a cloud-based platform that can initiate various actions based on received messages. The router also sends some messages from the queue to a module that analyzes the messages and reduces their size by aggregating, correlating, and detecting relevant information. The module puts the modified messages back into the queue for further routing by the router according to the policy. Related apparatus, systems, techniques and articles are also described.

40 Claims, 3 Drawing Sheets

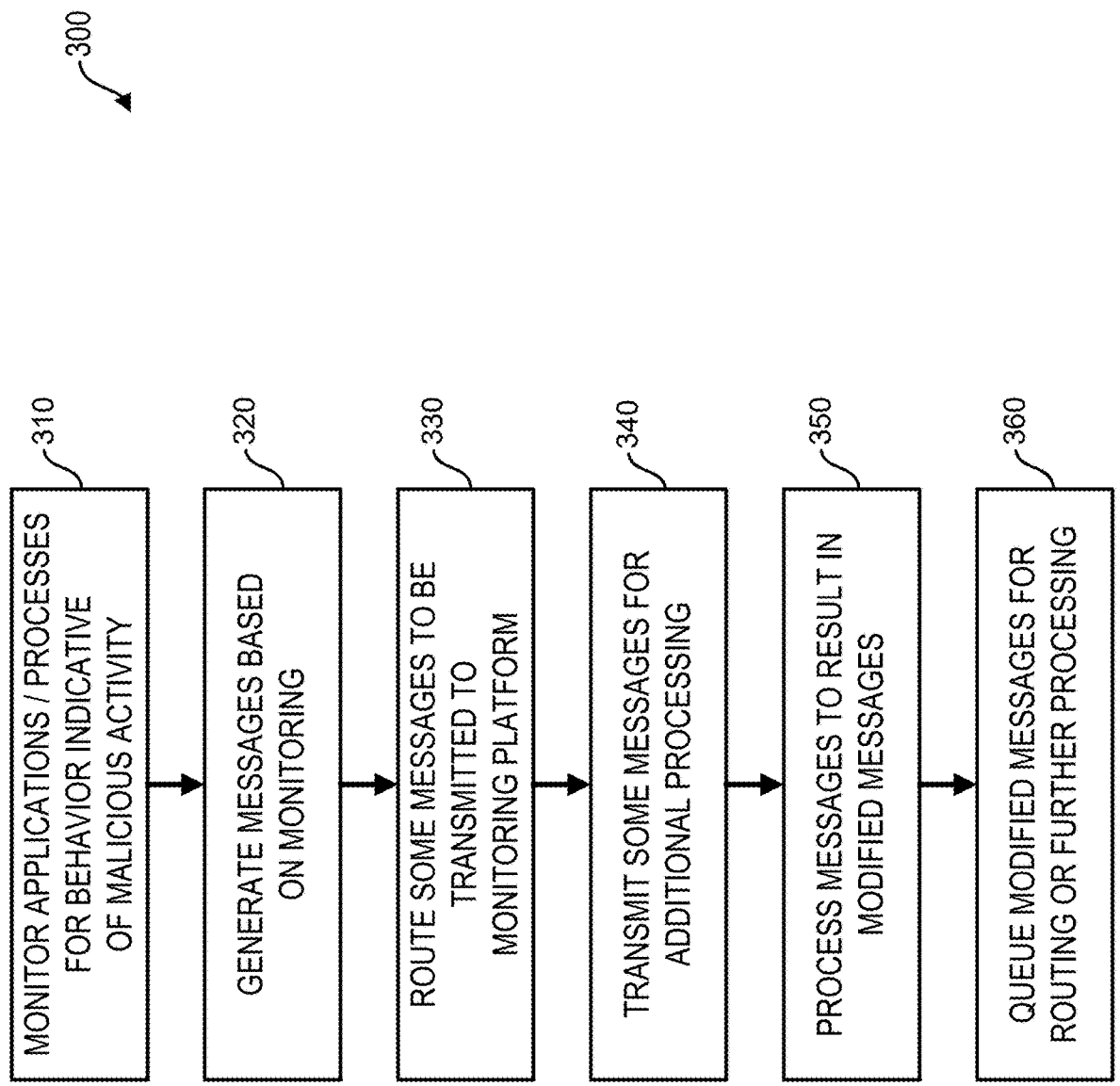

AGENT MESSAGE BUS

RELATED APPLICATION

The current application claims priority to U.S. patent application Ser. No. 18/744,564 filed on Jun. 14, 2024, the contents of which are hereby fully incorporated by reference.

TECHNICAL FIELD

The subject matter described herein relates to an agent-based messaging bus for selectively transmitting messages indicative of system health (including malicious activity) to a cloud-connected monitoring platform.

BACKGROUND

Cybersecurity threats are designed to evade modern security tools by delivering or otherwise executing code within a computing environment which, when executed, implement various malicious activities. Given the increasing sophistication of these threats, security tools within the computing environment can be bypassed resulting in problematic code being inserted, accessed, stored, or executed. In order to counter such activities, agents can be executed on endpoints to monitor and report events that are indicative of a security breach. Given the complexities associated with emerging cyber threats, frequent and sophisticated messaging capabilities responsive to these monitored events are needed.

SUMMARY

In a first aspect, applications and processes executing on an endpoint are monitored for behavior indicative of system health including malicious activity. Based on this monitoring, a plurality of messages are generated which are indicative of system health and which are placed in a queue for access by a router. In some variations, messages from an external message source which can, for example, provide context for the computing environment of the endpoint can be received and placed in the queue. The router routes a first subset of the messages from the queue as defined by a routing policy to be transmitted to a cloud-connected monitoring platform or an on-premise monitoring platform. The router transmits a second subset of messages from the queue as defined by the routing policy to an aggregation, correlation, and detection core (AC+DC). The AC+DC processes the second subset of messages to result in a plurality of modified messages (which can be smaller than the second subset of messages). The AC+DC can cause the modified messages to be placed into the queue for subsequent selective routing (i.e., processing, etc.) by the router according to the routing policy.

The monitoring platform, based on the received messages, can make a determination that a security event (e.g., attack, etc.) has commenced. The monitoring platform can, in response to such a determination, can trigger one or more actions to counter the security event. The security event can take varying forms including an attack (e.g., ransomware attack, etc.), a file or system vulnerability, or other event which causes the endpoint and/or the computing environment in which the endpoint is executing to behave in an undesired manner.

The monitoring platform can trigger various actions in response to the received messages. For example, the one or more actions can include triggering a backup operation on the endpoint, killing a process being executed on the endpoint associated with the security event, dynamically updating the routing policy to counter the security event, dynamically updating AC+DC core logic used by the AC+DC to counter the security event, suspending or terminating access to a user account associated with the security event, isolating the endpoint from any associated communications networks by turning off any communications adapters or interfaces.

As noted above, in some variations, additional messages can be received from an external message source (e.g., one or more computing devices, etc.). Such messages can be placed in the queue and can be processed in a similar fashion to those messages generated on the endpoint.

A suspiciousness level can be generated using messages generated by the endpoint and/or messages from the external message source. This suspiciousness level can be used by the router in connection with its routing policy to determine whether messages form part of the first subset of messages or the second subset of messages. The suspiciousness level can be based on different factors including one or more of identified behavior indicative of a security event, executables or other files which are deemed to be malicious, detected network traffic indicative of a security event and the like.

The router can route a third subset of the messages from the queue as defined by the routing policy to be discarded.

The AC+DC can process the second subset of messages using rules defined by an AC+DC core logic. The AC+DC can receive messages generated by the monitoring platform and process them using AC+DC core logic.

In an interrelated aspect, applications and processes executing on an endpoint are monitored for behavior indicative of system health. Based on such monitoring, a first plurality of messages are generated and placed in a queue for access by a router. In addition, a second plurality of messages are received from an external message source indicative of system health of other computing devices within a same computing environment and are placed in the queue for access by the router. The router routes a first subset of the messages from the queue as defined by a routing policy to be transmitted to a cloud-connected or on-premise monitoring platform. The router transmits a second subset of messages from the queue as defined by the routing policy to an aggregation, correlation, and detection core (AC+DC). The AC+DC processes the second subset of messages to result in a plurality of modified messages (which can have a smaller individual and/or aggregate size than the second subset of messages). The AC+DC can cause the modified messages to be placed into the queue for subsequently selective routing by the router according to the routing policy.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter provides for less costly techniques (in terms of computing resources) for processing, storing, and transmitting messages associated with security events including ransomware attacks from an endpoint to a cloud service or other remote computing device. Stated differently, the current subject matter is advantageous in that it provides a cloud-connected endpoint infrastructure that maximizes message value while reducing messaging-related processing, storage, and bandwidth costs. Furthermore, the current subject matter provides enhanced flexibility in that message handling can be updated independently from the message generating applications or processes.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

FIG. 3 is a process flow diagram illustrating the selective transmission of messages as part of a monitoring platform.

DETAILED DESCRIPTION

The current subject matter is directed to a cloud-based monitoring platform in which agents executing on various endpoints (i.e., monitored computing devices) selectively send messages to a backend (e.g., server, cloud service, etc.) in a computationally efficient manner. These messages can be indicative of system health including malicious activity indicative of a security breach (e.g., ransomware, etc.) or activities otherwise causing the monitored systems to operate in an undesired manner.

Figure 1:
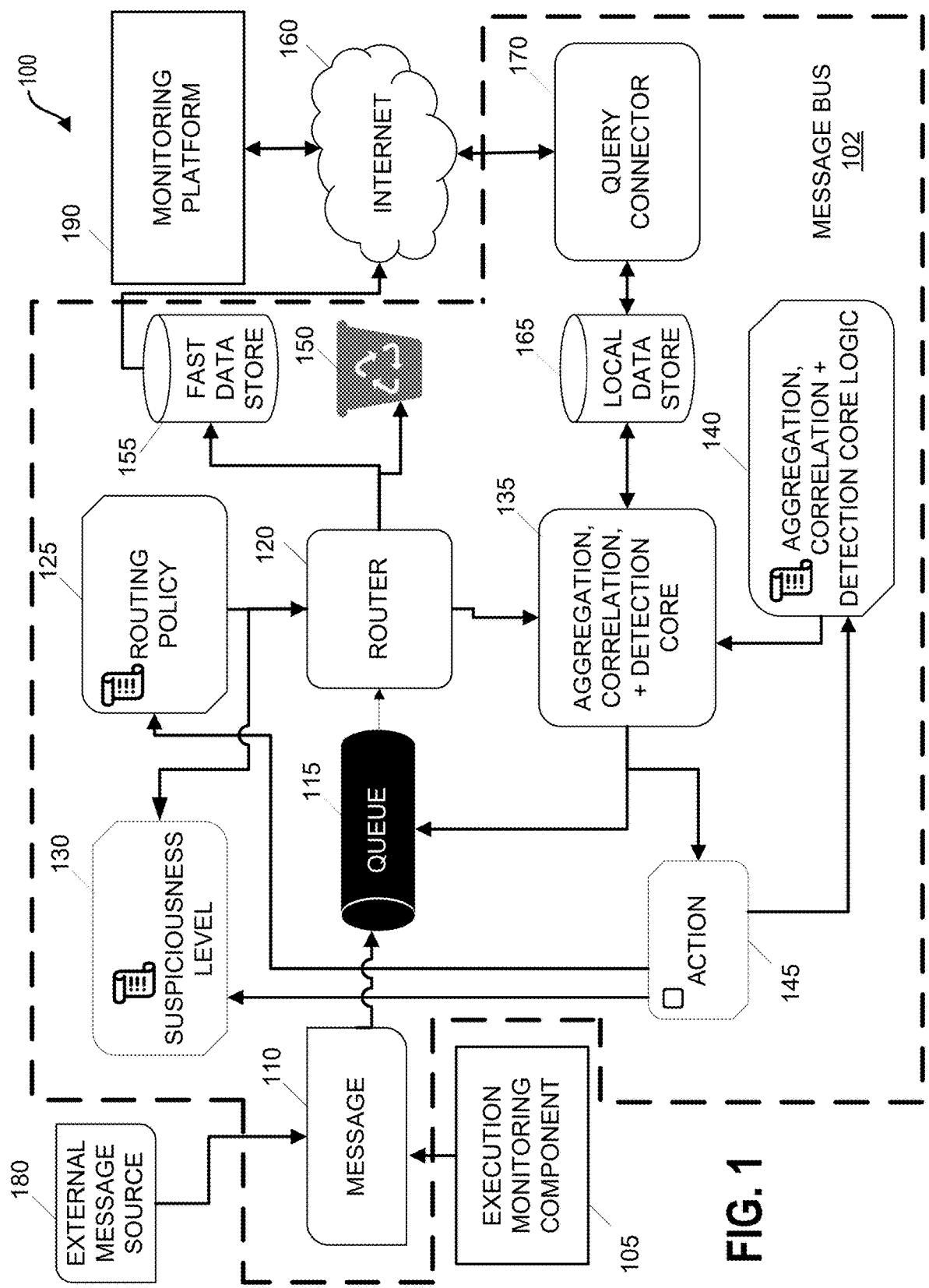
FIG. 1 is an architecture diagram illustrating components of a monitoring platform agent messaging bus.

FIG. 1 is an architecture diagram 100 of an agent message bus 102 in which messages generated by an execution monitoring component 105 executing on a computing device (sometimes referred to as an endpoint) are selectively transmitted to a monitoring platform 190 (which can be a cloud-based platform and in some variations can be configured to monitor security events associated with different attacks or threats including ransomware). The monitoring platform 190 can analyze messages indicative of system health and cause corrective actions to be initiated (either directly or indirectly). In some cases, the messages are indicative of a security event such as an attack, a file or system vulnerability, or some action which causes a system, application, or process to potentially behave in an undesired manner. Other components executing on the endpoint can generate the messages described herein (and for ease of illustration, only the execution monitoring component 105 is referenced). Selective, in this context, can mean that not all messages are transmitted and/or that other processing steps are taken with regard to the messages generated by the execution monitoring component 105 before these messages or derivations therefrom are transmitted to the monitoring platform 190. The execution monitoring component 105 can be a lightweight background app installed on the operating system of the endpoint to constantly assess various processes, applications, and files as potentially being malicious (i.e., indicative of ransomware, etc.). The execution monitoring component 105 generates messages 110 as part of this monitoring which characterize various events and other attributes of interest. In some variations, messages can be derived from an external message source 180 (e.g., one or more remote computing devices, etc.). Such external messages can provide insight into other computing devices forming part of a computing environment and the like. For example, if suspicious or malicious behavior is detected on a different computing device, an alert can be sent by the external message source 180 indicating the same. The messages from the external message source 180 can be processed in a similar fashion to those generated on the endpoint (i.e., message 110). These messages 110 are selectively processed on and/or transmitted by the endpoint to the monitoring platform 190. The execution monitoring component 105 can be, for example, kernel component monitoring from lower level events, a process monitoring component which create process level events, and/or a pre-execution component which creates events from inside the endpoint models and rules. As noted above, other messages which characterize the computing environment of the endpoint can be received from an external message source 180.

On the endpoint, the messages 110 generated by the execution monitoring component 105 can be placed within one or more queues 115 for access by a router 120. The router 120 can utilize a routing policy 125 in order to determine how to treat each message 110. For example, the agent message bus 102 can provide that different messages 110 have different levels of urgency. The router 120 can cause immediate or urgent messages 110 to be sent to the monitoring platform 190 right away, while the router 120 can cause other messages 110 to be grouped and sent in batches. With the immediate or urgent messages, the router 120 can cause such massages to be stored, for example, in a fast data store (e.g., in-memory database, etc.) as a staging area prior to transmission to the monitoring platform 190 The routing policy 125 can also provide that the router 120 sends messages 110 only if certain conditions are met. The certain conditions can be defined to relate to differing triggers relating to aspects such as a number of messages sent over a certain time period, a suspiciousness level for the endpoint and the like. Managing messages based on their priority or other routing policies provides savings on bandwidth, processing, and storage costs. The routing policy 125 can also specify that certain messages are discarded or otherwise deleted 150.

The routing policy 125 can be designed to enable updates via content distribution and be comprehensible to a domain expert. The router 120, using the routing policy 125, can process a wide variety of message types (e.g., all message types, etc.) without necessitating changes to the router 120. The routing policy 125 can also allow for message content inspection (e.g., type of message, value of fields within the message, etc.), logical comparisons (e.g., comparing values in the field to be equal to or greater than, other Boolean operators, whether IP address is within a certain subnet, etc.), use of persistent state variables (i.e., variables that are updated within the router based on the processing of a message such as, for example, update the "count of message type X" every time a "message type X" is processed), and categorize messages by priority, with the option to route them to an Aggregation, Correlation +Detection Core (AC+DC) 135.

In some case, certain messages 110 only become valuable after being aggregated (e.g., messages over a certain time period). In addition or alternative, in some cases, messages 110 gain value only after a specific set of messages is collected (e.g., which may be received in sequence or which may be received randomly, etc.). The AC+DC 135 can monitor and combine these messages to form a new, valuable second order message when the necessary first order message set has been generated. As an example, a set of first order message can include:

"presentation.pptx" was opened.
"presentation.pptx" was modified.
"presentation.pptx" was closed.
"presentation.pptx" was renamed to "presentation.pptx.locked".

With such an arrangement, the resulting second order message can be "presentation.pptx was ransomed".

Message processing by the AC+DC 135 can be dictated by AC+DC core logic 140. The AC+DC core logic 140 can comprise certain rules or models configured to enable content-based updates within the execution monitoring component 105 which can be crafted automatically and/or by those with domain expertise. The AC+DC core logic 140 can also enable the AC+DC 135 to handle new message types in the queue 115. Fulfilling these conditions, the AC+DC core logic 135 can facilitate operations such as extracting message elements, accessing the local data store 165 (described in more detail below), performing logical comparisons within and between messages 110, and managing state variables across messages 110. The AC+DC 135, after generating a new message or otherwise bundling some or all of two or more messages, causes such new/modified messages to be placed in the queue 115 for routing by the router 120 using the routing policy. In other cases, the AC+DC 135 can cause the new/modified message to trigger an action 145 or, alternatively, the AC+DC 135 can directly trigger an action. Action 145 in this context can refer to a variety of operations that fall under the umbrella of an intervention. Examples can include, for example, triggering a backup operation to occur, killing a process, triggering a restore (from backup) operation, suspending a user's account, and/or isolating a device from a network (e.g., by turning off communications interfaces/connectors, etc.). In some cases, the action 145 can be to change or otherwise provide context for the suspiciousness level 130 calculation. The action 145 can also cause one or more of the AC+DC core logic 140 and the routing policy 125 to be dynamically updated/modified to reflect real-time events (e.g., malicious actions, etc.). Further, AC+DC 135 can cause messages to be periodically sent to the monitoring platform 190 which are indicative of system health. For example, a health update message can be sent to the monitoring platform 190 every 5 seconds, etc.

The importance of messages 110 can vary depending on the activity at an endpoint. In most scenarios, it is not desirable to send or otherwise analyze messages for all executing processes given the computational resources required. To address this, a suspiciousness level 130 for the endpoint can be used by the router 120 (as specified by the routing policy 125) and/or the AC+DC 135 (as specified by the AC+DC core logic 140) when taking certain actions or making certain decisions. The suspiciousness level 130 can be generated by the execution monitoring component 105 or a different agent, application, or process executing on the endpoint or externally (e.g., from external message source 180, etc.) and can be indicative of the endpoint being compromised. These suspiciousness level 130 can be generated by applications or processes which monitor events indicative of malicious activity (e.g., behavior indicative of an attack, executables that are deemed malicious, network traffic indicative of an attack, etc.). The agent message bus 102 can generate or otherwise obtain a suspiciousness level 130 for the endpoint, adjusting it according to any suspicious activities detected. The suspiciousness level 130 for the endpoint allows different components such as the router 115 (by way of the corresponding routing policy 120) and the AC+DC 130 (by way of the ACD+DC core logic 140) to selectively route, aggregate, modify, queue, act on, and/or discard messages 110. For example, a higher suspiciousness level 130 can cause more messages 110 to be routed as immediate/urgent causing them to more rapidly be routed to the monitoring platform 190 by way of the fast data store 155. As another example, a lower suspiciousness level 130 can cause certain messages 110 to be discarded 150, or routed to the the AC+DC 135 for additional processing.

The local data store 165 can store the messages that have been seen, and state information such as the number of executions that have recently occurred, the number of encryption operations that happened recently, etc. The local data store 165 can additionally have a time-to-live for all records stored within such that when they expire, they are deleted in order to optimize the storage space required.

A query connector 170 can provide additional context regarding a message 110 which can be used by the router 120 and/or the AC+DC 130 in determining how to treat a particular message 110. The monitoring platform 190 can put messages into the local data store 165 through the query connector 170. This arrangement allows the router 120 and the AC+DC 135 to use such messages in their normal operations.

The significance of a message 110 depends on its context. The execution monitoring component 105 only has local context (i.e., context of the endpoint) while the monitoring platform 190 can have a broader perspective across a large number of endpoints (e.g., all endpoints for a particular enterprise, etc.). The query connector 170 can be used by the monitoring platform 190 to request messages 110 that, from the limited view of the execution monitoring component 105 might not seem important enough to send. Such requests can, for example, cause a change to the routing policy 125 and/or the AC+DC core logic 140. Stated differently, messages that are not economically feasible (from a resource standpoint) are not sent to the monitoring platform 190. However, the cloud may have more information that changes such economics such as the endpoint has been compromised which would change the rules regarding transmission of messages. Additionally, a user of the console may want the information that is traditionally stored inside the local data store 165. In this scenario, the monitoring platform 190 can ask the endpoint for the local data store 165 information through the query connector 170.

Figure 2:
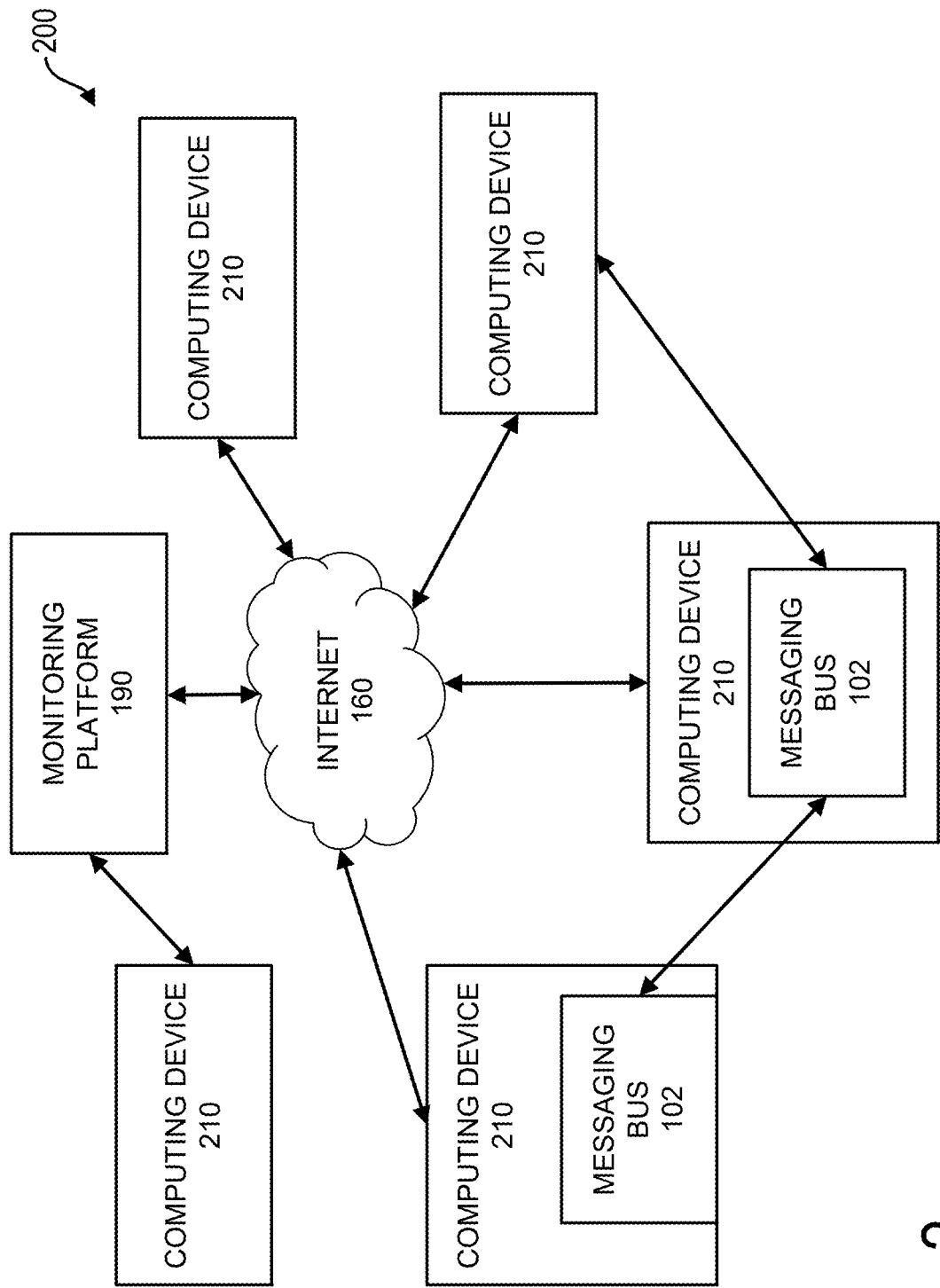
FIG. 2 is an architecture diagram illustrating the monitoring platform of FIG. 1 interfacing with a plurality of computing devices.

FIG. 2 is a diagram 200 illustrating aspects relating to the external message sources 190. In this example, there can be a plurality of computing devices 110 which can interface either directly or indirectly with the monitoring platform 160 by way of the Internet 160 (or other network). These computing devices 210 can generate messages indicative of system health on such device and transmit such messages to a peer (message bus 102 to message bus 120 or computing device 210 to computing device 210) or by way of the Internet 160 to a different computing device 210. These system health messages can, for example, provide swarm intelligence indicative of whether there is a security event on a computing device 210 which, in turn, might cause the suspiciousness level on one or more of the other computing devices to be elevated (so that corrective actions can occur such as updating the AC+DC core logic and/or routing policy).

FIG. 3 is a process flow diagram 300 in which, at 310, applications and processes executing on an endpoint are monitored for behavior which is indicative of ransomware or other malicious activity. Based on this monitoring, at 320, a plurality of messages are generated and some or all of such messages can be placed in a queue. In addition, in some variations, messages from an external message source are also placed in the queue for processing (and to provide additional computing environment context). A router, which has access to the queue, at 330, routes certain messages (e.g., a first subset of the messages, etc.) from the queue using a routing policy for transmission to a cloud-connected or on-premise monitoring platform. The router, using the routing policy, at 340, also transmits other messages (e.g., a second subject of messages) from the queue to an aggregation, correlation, and detection core (AC+DC). The AC+DC, at 350, processes the second subset of messages to result in a plurality of modified messages. In some variations, the plurality of modified messages is smaller than the second subset of messages (which has the technical benefit of reduced resource consumption while still providing protection against security events such as ransomware attacks). The AC+DC causes, at 360, the modified messages to be placed into the queue for subsequently selective routing (transmission to the monitoring platform, subject to further processing by the AC+DC, discarding, etc.) by the router according to the routing policy.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor (e.g., CPU, GPU, etc.), which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computing device having a display device (e.g., a LED, OLED, or LCD screen/monitor) for displaying information to the user and a keyboard and an input device (e.g., mouse, trackball, touchpad, touchscreen, etc.) by which the user may provide input to the computing device. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A method for implementation by one or more computing devices comprising:
   routing a first subset of a plurality of messages from a queue as defined by a routing policy to be transmitted over the Internet to a remote computing device, the plurality of messages in the queue being generated by or derived from monitoring applications and processes executing on an endpoint for behavior indicative of malicious activity;
   transmitting a second subset of messages from the queue as defined by the routing policy to an aggregation, correlation, and detection core (AC+DC);
   processing, by the AC+DC, the second subset of messages to result in a plurality of modified messages, the plurality of modified messages being smaller than the second subset of messages; and
   causing, by the AC+DC, the modified messages to be placed into the queue for subsequently selective routing according to the routing policy.

2. The method of claim 1 further comprising:
   determining, by the remote computing device and based on received messages, that a security event has commenced; and
   triggering, by the remote computing device in response to the determination, one or more actions to counter the security event.

3. The method of claim 2, wherein the security event is a ransomware attack.

4. The method of claim 2, wherein the one or more actions comprise:
   triggering a backup operation on the endpoint.

5. The method of claim 2, wherein the one or more actions comprise:
   killing a process being executed on the endpoint associated with the security event.

6. The method of claim 2, wherein the one or more actions comprise:
   dynamically updating the routing policy to counter the security event.

7. The method of claim 2, wherein the one or more actions comprise:
   dynamically updating and AC+DC core logic used by the AC+DC to counter the security event.

8. The method of claim 2, wherein the one or more actions comprise:
   suspending or terminating access to a user account associated with the security event.

9. The method of claim 2, wherein the one or more actions comprise:
   isolating the endpoint from any associated communications networks by turning off any communications adapters or interfaces.

10. The method of claim 1 further comprising:
    receiving additional messages from an external message source;
    wherein the additional messages are processed using the routing policy and the AC+DC.

11. The method of claim 1 further comprising:
    generating, by an application or process executing on the endpoint, a suspiciousness level indicative of a level of malicious activity on the endpoint;
    wherein the suspiciousness level is used by the routing policy to determine whether messages form part of the first subset of messages or the second subset of messages.

12. The method of claim 1 further comprising:
    receiving a message from an external message source indicating a suspiciousness level indicative of a level of malicious activity on a different computing device in a same computing environment;
    wherein the suspiciousness level is used by the routing policy to determine whether messages form part of the first subset of messages or the second subset of messages.

13. The method of claim 11, wherein the suspiciousness level is based on identified behavior indicative of a security event.

14. The method of claim 11, wherein the suspiciousness level is based on executables or other files which are deemed to be malicious.

15. The method of claim 11, wherein the suspiciousness level is based on detected network traffic indicative of a security event.

16. The method of claim 1 further comprising:
    routing a third subset of the messages from the queue as defined by the routing policy to be discarded.

17. The method of claim 1, wherein the AC+DC processes the second subset of messages using rules defined by an AC+DC core logic.

18. The method of claim 17 further comprising:
    receiving, by the AC+DC, messages generated by the remote computing device; and
    processing, by the AC+DC, the messages generated by the remote computing device using AC+DC core logic.

19. A method for implementation by one or more computing devices comprising:
    monitoring applications and processes executing on an endpoint for behavior indicative of malicious activity, the applications generating a plurality of messages which are queued in a queue;
    selectively routing a first subset of the messages to be transmitted over the Internet to a remote computing device;
    transmitting a second subset of messages from the queue to an aggregation, correlation, and detection core (AC+DC);
    processing, by the AC+DC, the second subset of messages to result in a plurality of modified messages, the plurality of modified messages being smaller than the second subset of messages; and
    causing, by the AC+DC, the modified messages to be placed into the queue for subsequently selective routing.

20. The method of claim 19, wherein selecting the first subset of the messages to be transmitted comprises applying a routing policy that elevates priority for messages associated with a suspiciousness level exceeding a threshold value.

21. The method of claim 19, wherein transmitting the second subset of messages to the AC+DC comprises writing the second subset to a local data store with a time-to-live, and wherein the AC+DC retrieves messages from the local data store for aggregation.

22. The method of claim 19, wherein processing the second subset of messages comprises correlating a sequence of file activity events associated with a same file identifier to generate a second-order message indicative of ransomware behavior.

23. The method of claim 19, further comprising receiving, by the AC+DC, one or more instructions from the remote computing device to update AC+DC core logic, and applying the updated AC+DC core logic to subsequent processing of the second subset of messages.

24. The method of claim 19, wherein causing the modified messages to be placed into the queue further comprises tagging the modified messages with a priority label selected from urgent, batch, and discard, wherein the routing policy routes urgent messages to the remote computing device via a fast data store.

25. A method for implementation by one or more computing devices comprising:
- monitoring applications and processes executing on an endpoint for behavior indicative of system health;
- generating a first plurality of messages based on the monitoring, the first plurality of messages being placed in a queue for access;
- receiving a second plurality of messages from an external message source indicative of system health of other computing devices within a same computing environment, the second plurality of messages being placed in the queue;
- transmitting a subset of messages from the queue to an aggregation, correlation, and detection core (AC+DC);
- processing, by the AC+DC, the subset of messages to result in a plurality of modified messages, the plurality of modified messages being smaller than the second subset of messages; and
- causing, by the AC+DC, the modified messages to be placed into the queue for subsequently selective routing.

26. The method of claim 25, wherein the first plurality of messages comprises kernel-level execution events, process creation events, file I/O events, and network connection events generated on the endpoint.

27. The method of claim 25, wherein receiving the second plurality of messages from the external message source comprises receiving a suspiciousness indicator associated with another endpoint in a same enterprise environment, and adjusting a routing priority for messages in the queue based on the suspiciousness indicator.

28. The method of claim 25, wherein the AC+DC applies rule-based AC+DC core logic that performs time-window aggregation over the subset of messages to reduce an aggregate size of the subset by at least a predetermined percentage.

29. The method of claim 25, further comprising discarding, by the routing policy, a third subset of the messages from the queue based on one or more conditions including message type frequency exceeding a threshold and the suspiciousness level being below a threshold.

30. The method of claim 25, further comprising, responsive to the AC+DC generating a modified message indicative of a security event, triggering an action comprising at least one of: suspending a user account on the endpoint, terminating a process identified in the modified message, or disabling a network interface of the endpoint.

31. A system comprising:
- an endpoint device including one or more processors and memory storing instructions that, when executed by the one or more processors, cause the endpoint device to:
  - monitor applications and processes executing on the endpoint device to generate a plurality of messages indicative of system health; and
  - enqueue the plurality of messages in a queue; and
- a router configured by a routing policy to route a first subset of the messages from the queue to a remote monitoring platform and to route a second subset of the messages from the queue to an aggregation, correlation, and detection core (AC+DC);
- wherein the AC+DC is configured to process the second subset of the messages to produce a plurality of modified messages and to place the plurality of modified messages into the queue for subsequent routing according to the routing policy, the plurality of modified messages being smaller than the second subset of messages.

32. The system of claim 31, wherein the routing policy dynamically adjusts routing behavior based on a suspiciousness level computed from at least one of: identified behavior indicative of a security event, detection of malicious executables, or anomalous network traffic.

33. The system of claim 31, further comprising a local data store coupled to the router and the AC+DC, the local data store being configured to persist messages and state variables with respective time-to-live values, and to expose stored data to the AC+DC for aggregation and correlation operations.

34. The system of claim 31, wherein the router is configured to assign a priority to messages selected from urgent, batch, and discard, and to transmit urgent messages to the remote monitoring platform via a fast data store while batching messages of lower priority.

35. The system of claim 31, wherein the AC+DC comprises AC+DC core logic including rules that detect multi-event patterns across the second subset of messages, and upon detecting a pattern corresponding to ransomware behavior, generate a modified message indicative of a ransomware event.

36. The system of claim 31, wherein the endpoint device further comprises a query connector configured to receive, from the remote monitoring platform, requests for locally stored messages and to update at least one of the routing policy or the AC+DC core logic in response to the requests.

37. The system of claim 31, further comprising an external message interface configured to receive a second plurality of messages indicative of system health from at least one external message source associated with another endpoint in a same computing environment, and to place the second plurality of messages into the queue for processing by the router and the AC+DC.

38. The system of claim 31, wherein the remote monitoring platform is configured to analyze messages received from the endpoint device and, responsive to determining that a security event has commenced, to transmit a control instruction to the endpoint device to perform an action comprising at least one of: initiating a backup operation, terminating a process, updating the routing policy, updating the AC+DC core logic, suspending a user account, or isolating the endpoint device from a network.

39. The system of claim 31, wherein the router maintains persistent state variables updated as messages are processed, including counts of message types and sliding- window statistics, and uses the persistent state variables in evaluating conditional expressions defined in the routing policy.

40. The system of claim 1, wherein the AC+DC is further configured to reduce an aggregate size of the second subset of messages by aggregating related messages within a time window, correlating messages sharing common identifiers, and detecting patterns that permit emitting a single second-order modified message in place of multiple first-order messages.

* * * * *